Oct. 21, 1958　　　S. R. BEYETTE　　　2,856,845
CHRISTMAS TREE BALER
Filed Jan. 7, 1958　　　　　　　　　　　　6 Sheets-Sheet 1

INVENTOR.
SANFORD R. BEYETTE

Oct. 21, 1958 S. R. BEYETTE 2,856,845
CHRISTMAS TREE BALER
Filed Jan. 7, 1958 6 Sheets-Sheet 2
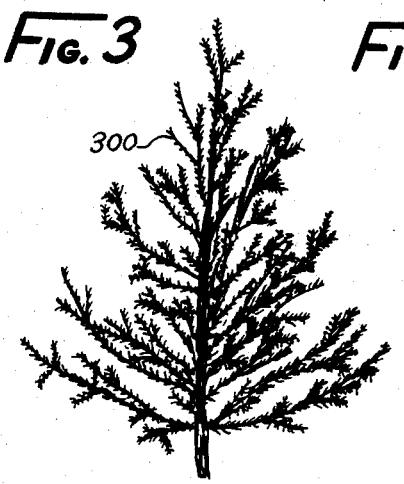
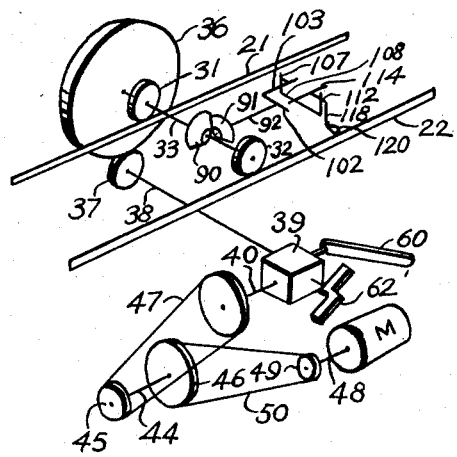
INVENTOR.
SANFORD R. BEYETTE

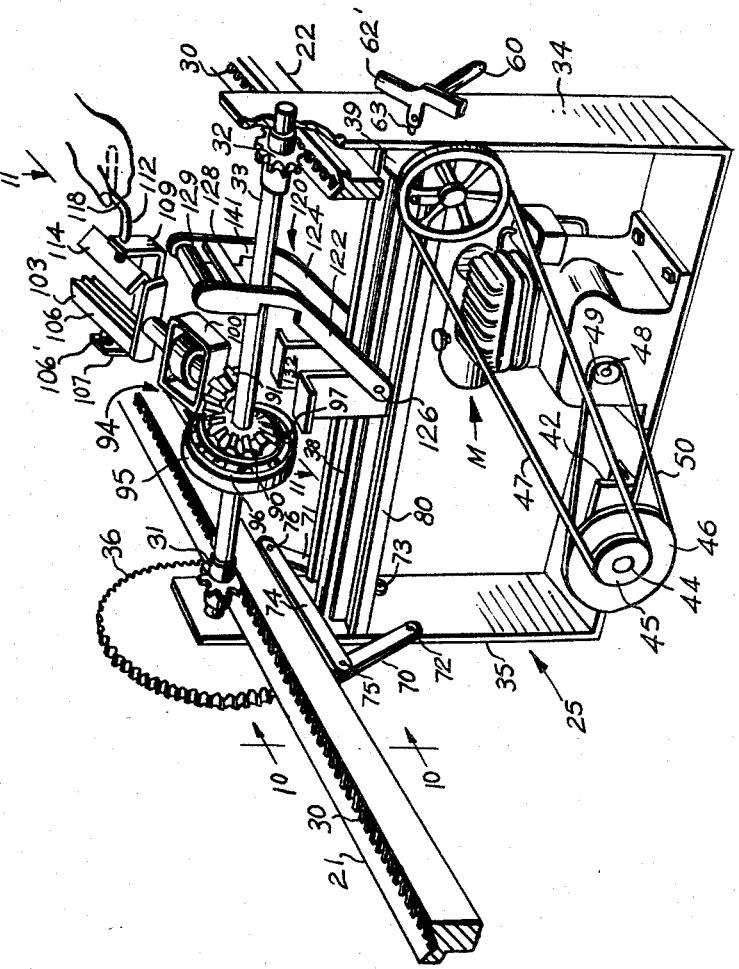

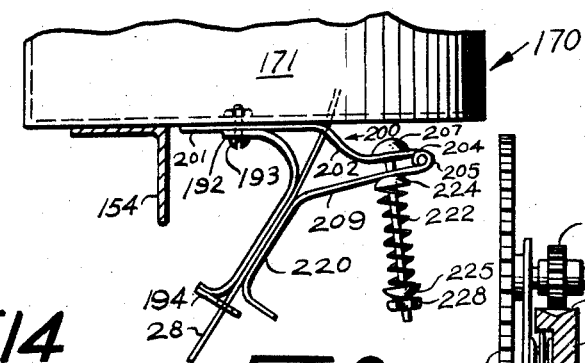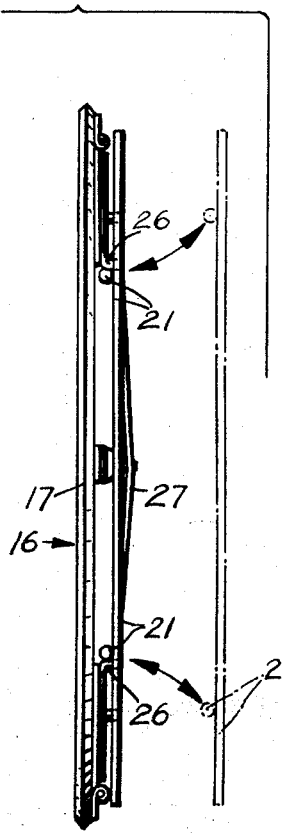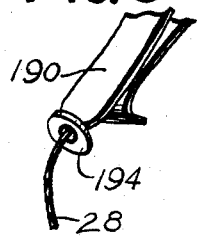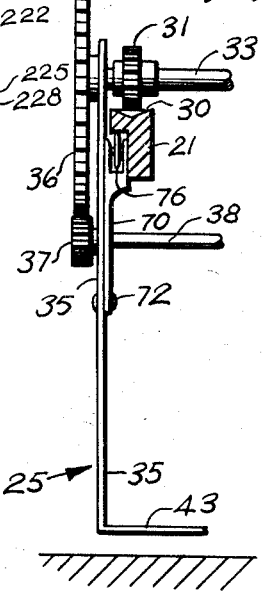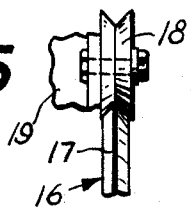
INVENTOR.
SANFORD R. BEYETTE

Oct. 21, 1958  S. R. BEYETTE  2,856,845
CHRISTMAS TREE BALER
Filed Jan. 7, 1958  6 Sheets-Sheet 6
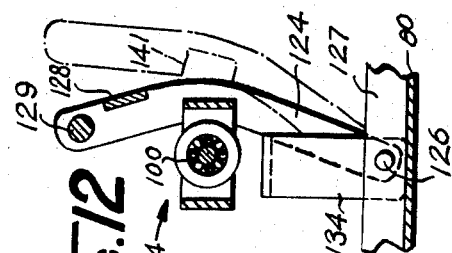
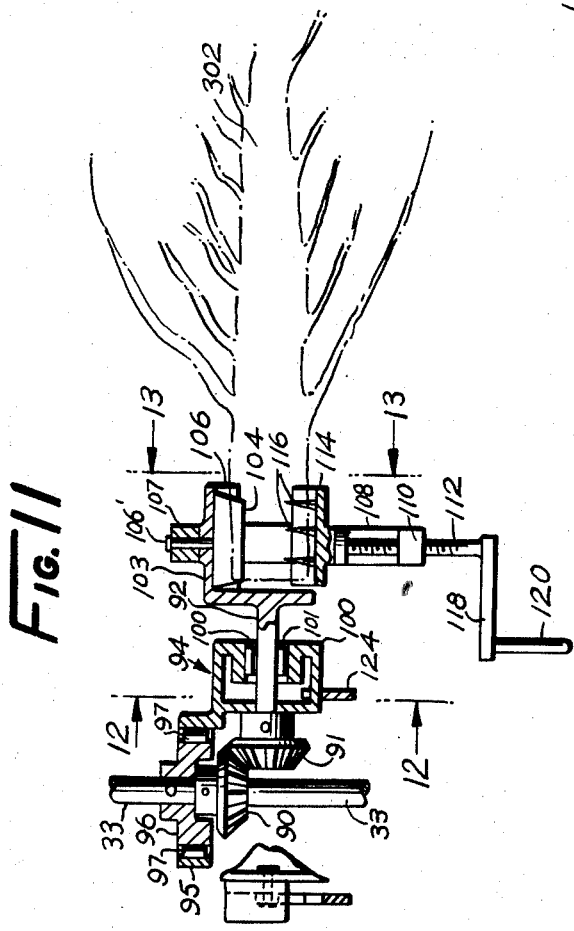
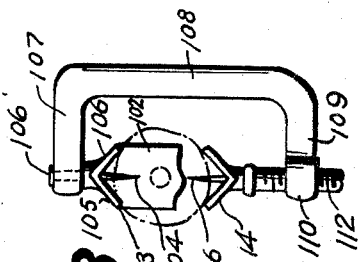
INVENTOR.
SANFORD R. BEYETTE

United States Patent Office 2,856,845
Patented Oct. 21, 1958

2,856,845

CHRISTMAS TREE BALER

Sanford R. Beyette, St. Regis Falls, N. Y.

Application January 7, 1958, Serial No. 707,518

5 Claims. (Cl. 100—13)

This invention relates to Christmas tree balers and more particularly to an improved Christmas tree baler of the type disclosed and claimed in my previously issued Patent No. 2,792,775, dated May 21, 1957.

It is an object of the present invention to provide a baler which is capable of baling Christmas trees rapidly and which is adapted to materially decrease the time ordinarily consumed in baling said trees entirely by hand.

It is a further object of the present invention to provide a Christmas tree baler which is so arranged that Christmas trees can be fed into each end thereof, the operating means such as a gasoline motor being therefore utilized with maximum efficiency and with a minimum of waste motion unaccompanied by a tree baling operation.

It is a further object of the invention to provide a baler which can bale Christmas trees in perfect condition at a rate of one tree per minute, while utilizing a relatively simple, compact, efficient and rugged combination of parts, which consistently produces uniform results.

Still another object of the present invention is to provide a Christmas tree baler having a loading station for rotatably supporting the tree as it is drawn longitudinally therethrough, so that the branches may be compressed as the tree is twisted without permitting any relative rotation between the tree and supporting frame, thus preventing damage to the tree that might otherwise result from this forceful twisting movement.

A further object of the present invention is to provide a Christmas tree baler of the above type that eliminates all relative rotational movement between the tree and supporting structure as it is pulled through the baler, such that there is only relative longitudinal movement therebetween, whereby resistance to such movement is further decreased so as to increase the speed of the baler and to reduce the unit time necessary to bale each tree.

Other objects of the invention are to provide an improved Christmas tree baler bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 3 shows a Christmas tree or the like prior to baling by the invention;

Figure 4 shows a Christmas tree after baling by the apparatus according to the invention;

Figure 5 is a diagrammatic representation of the driving means effecting rotation of a tree being baled and effecting progress of such tree through the machine;

Figure 6 is a fragmentary perspective view of the movable carriage of the apparatus carrying the principal drive mechanism for causing longitudinal and rotational movement of the tree being baled;

Figure 8 is a fragmentary side elevational view of the string feeding means;

Figure 9 is a fragmentary perspective detail, enlarged, of such string feeding means;

Figure 10 is a fragmentary section taken along the lines 10—10 of Figure 6;

Figure 11 is a sectional view taken along the lines 11—11 of Figure 6;

Figure 12 is a sectional view taken along the lines 12—12 of Figure 11;

Figure 13 is an end plan view taken along the line 13—13 of Figure 11;

Figure 14 is an enlarged side elevational view of an auxiliary support frame for rotatably and slidably supporting the Christmas tree to be baled at the loading station; and Figure 15 is an enlarged fragmentary side elevational view of the rotatable support means for the auxiliary frame shown in Figure 14.

Figure 7:
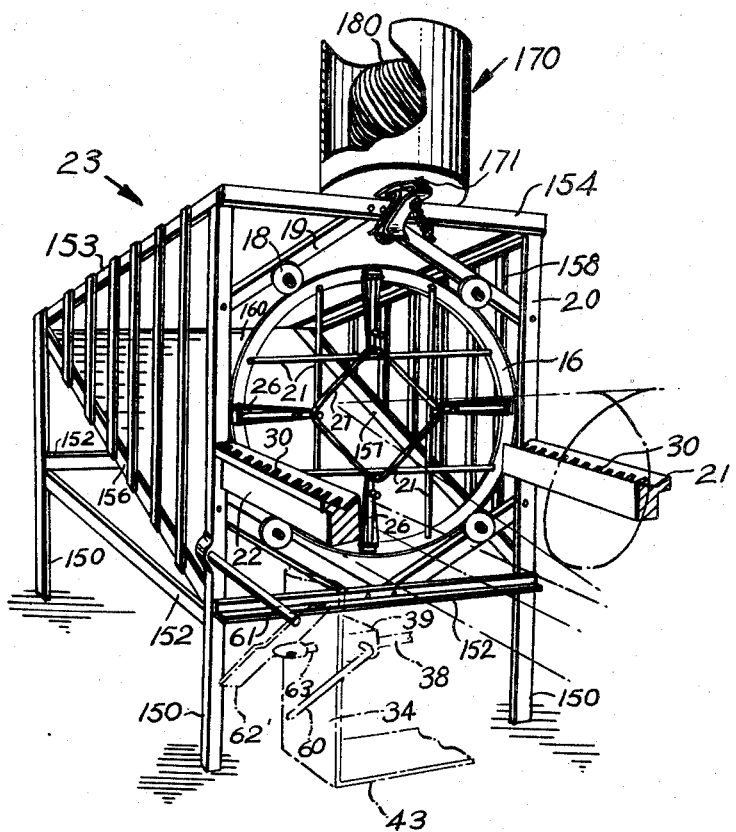
Figure 7 is a perspective view of one end station of the machine at which a Christmas tree loading operation can be effected.

Referring now more in detail to the drawing, and more particularly to Figures 7, 14, and 15, the specific improved structure of the present invention is shown to include an annular ring 16 that constitutes an auxiliary frame member which is rotatably supported within the end frame 20 of each of the pair of tree loading stations 23, 24. Each such ring includes an outer peripheral tapered edge 17 that is rotatably received within four equally spaced apart pulleys 18. These pulleys are, in turn, rotatably carried upon corner braces 19 of each end frame 20 so as to rotatably support the ring 16 for free rotation relative thereto. Four equally spaced apart arms 26 are hingedly carried upon the front face of each ring 16 for movement between a normally coplanar position with the ring 16 and an outwardly extending position for purposes hereinafter described. Each such arm has a transversely extending rod 21 at its outer end which cooperates with the adjacent rods 21 of the other arms 26 to define a rectangular frame which increases in cross sectional area as the arms 26 are extended outwardly from the aforementioned coplanar initial position. A yieldable resilient band 27, however, in engagement with each of the arms 26 normally urges the arms to the coplanar position and resists movement of the arms outwardly therefrom.

With reference to Figure 6, it will be noted that each of the tree loading stations 23, 24 supports one end of a pair of horizontal members 21, 22. A small driving motor, such as a gasoline motor M is mounted upon a U-shaped frame 25 that is supported by and depends from the two horizontal members 21, 22, in a manner which will hereinafter be explained in greater detail.

In actual use, a tree is placed upon one of the loading stations 23, 24, with the trunk thereof clamped to the travelling U-shaped frame 25, following which the tree is simultaneously rotated and drawn through the rectangular opening defined by the cross rods 21 of the arms 26 carried by each of the rings 16. As the tree is pulled through this ring, the elastic band 27 permits the arms 26 and rods 21 to spread apart, but still exerts a sufficient pressure thereon to move the limbs of the tree toward a compressed position. During the rotational movement of the tree, the ring 16 rotates therewith by virtue of the free riding engagement with the pulleys 18, during which rotational movement a twine or cord 28 is wrapped around the tree to secure the branches in the compressed position as it is drawn through the arms. These arms and rods continuously follow the contour of the tree as it is drawn base first therethrough so that sufficient pressure is exerted even upon the small upper end of the tree as it finally emerges from the end frame 20 of the loading station. After completion of this operation, another tree is placed on the other loading station and the process repeated.

It will be observed that horizontal members 21, 22 are in reality racks having teeth 30 engageable with the teeth of pinions 31 and 32 mounted on a shaft 33 which is journalled at one end in upright portion 34 of U-shaped member 25, and which is journalled adjacent the other end thereof in upright member 35 of U-shaped member 25. The end of shaft 33 journalled in upright member 35 has keyed thereto a large gear 36 driven by a pinion 37, which later is keyed on a shaft 38 extending into a gear box 39, Figure 6. Gear box 39 has situated therein reversing gearing mechanism of any suitable type such for instance, as may be commonly found in use in connection with washing machines and the like. On a shaft 40 extending outwardly from the gear box 39 there is fastened, as by keying, a pulley. Mounted on an angle iron 42 secured to the bottom portion 43 of U-shaped member 25, there is journalled a shaft 44 having fastened thereto a pulley 45 of one size and another pulley 46 of a greater size. A suitable drive belt 47 is trained about pulleys 45 and 40 to connect the same in driving relation. The motor M, which may be a gasoline motor, has extending therefrom a shaft 48 having keyed thereon a pulley 49. A further drive belt 50 drivingly connects pulleys 49 and 46. It will be seen from the description that the motor M, through the various pulleys, belts and also the gear box drive the shaft 33. The gear box 39 has an operating lever 60 capable of selecting a desired operation, such as forward, neutral, and reverse. A shut off arm 61 at loading station 23 or a shut-off arm 62 at loading station 24 is provided for obvious reasons. The stopping device shuts the machine off from a point just above and below the center of arm 60. A handle 62' connected to a shaft 63 extending from gear box 39 is provided which is adapted to contact stop arms 61, 62 and which provides automatic control over the operation of the gear box.

Referring to Figure 10, and also to Figure 6, it will be seen that connected to upright member 35 of U-shaped carriage 25, two arms are provided 70, 71, fixed to member 35 at 72 and 73, as by bolts. A member 74 is provided connected by means of bolts 75 and 76 to arms 70 and 71 respectively. Arms 70 and 71 carry at the upper ends thereof rollers 76' and 77 in bifurcated portions. The arms 70, 71 and cooperating rollers 76', 77 serve to keep the U-shaped carriage rack from swaying. It will also be noted that a suitable bracket 80 is provided adjacent the upper ends of the members 35 and 34, in order to prevent the U-shaped rack 25 from spreading.

Shaft 33 also has connected thereto a gear 90 engaging an end carrying gear 91 fastened to a shaft 92 extending at right angles to shaft 33. A housing 94 is provided having a portion 95 which is rotatable about shaft 33 and which is kept in a desired relation with respect to a member 96 through the intermediary of bearings 97. Housing 94 also has a portion 100 which journals shaft 92 by means of bearings 101. The end of shaft 92 opposite the end carrying gear 91 is provided with a transversely extending member 102 which has extending at right angles to one end thereof a portion 103. Portion 103 is actually an angle member having extending therefrom and toward the axis of shaft 92 a blade member 104 which bisects the angle between the like members 105 and 106. Mounted atop portion 103 by means of a pin 106' is an arm 107 having depending therefrom and at right angles thereto a second arm 108, which in turn is provided with a further arm 109 extending at right angles therefrom and terminating in a portion 110 which is internally threaded and which receives a screw member 112. Screw member 112 has at the upper end thereof, as viewed in Figure 13, an angle member 114 similar to angle member 103 and which, instead of being provided with a blade member such as 104, is provided instead with a series of pointed members 116. Lower end of screw member 112 has attached thereto an arm 118 connected to a handle 120 extending at right angles thereto. It will be seen that if the trunk of the tree is received intermediate the angle members 103 and 114, and if the handle means 120 is thereafter operated, the blade means 104 and the pointed members 116 will, as the threaded member 112 advances the member 110, firmly seize and grasp the trunk of the tree. It will be seen moreover that as shaft 33 rotates, gear 90 also rotates, in turn driving meshing gear 91, which, being connected to shaft 92, causes members 103 and 114 and therefore the trunk of the tree and the entire tree to rotate bodily with respect to the axis of shaft 92. Keeping in mind that rotation of shaft 33 is accompanied by a transitory movement also, in view of the engagement of pinions 31 and 32 with horizontal members 21 and 22, it will be seen that rotation and longitudinal movement of the tree is effected by the means thus far described.

It will be observed in Figure 6 that a clutch arm 120 is provided. Clutch arm 120 has two separate arms 122 and 124 pivoted at the bottom about a shaft or pin 126 extending through a support member 127 mounted atop bracket 80. Arms 122 and 124 are connected adjacent the tops thereof by a cross bar 128 and a handle 129. A pair of lock arms 132 and 134 are also provided suitably secured to the members 127 hereinbefore mentioned. It will be seen that depending upon the direction in which shaft 33 turns, which in turn is dependent upon the adjustment of gear box 39, gear 91 will rotate in one or another of the two possible directions. As a result, unless otherwise restrained, rotation of gear 91 will cause the tree trunk clamping arrangement hereinbefore described to assume one of two possible end positions, one pointing toward tree receiving station 23 and the other pointing toward the receiving station 24. Members 132 and 134 are intended to limit the position of the tree trunk clamping means when pointing in either of the two directions mentioned. Clamp arms 122 and 124 are intended moreover to cooperate with housing 100, and by virtue of the slots 140 and 141 therein, to maintain housing 100 in a desired position until the end of a tree wrapping operation. Upon reversing of the direction of rotation of the shaft 33, and upon operating handle 129 to release the clamping members 140 and 141, the tree trunk clamping means will automatically assume a proper position for moving a tree in a direction opposite to the direction in which the tree which was just baled was moved. In this connection it may be well to observe that roller bearings 97 act in thrust to take the load from the gears. The repositioning feature just mentioned makes possible the use of the two loading stations just mentioned and also makes it possible to avoid causing the U-shaped carriage to traverse the horizontal members 21 and 22 without any load whatever, merely for the purpose of returning to the position in which a tree baling operation was initially commenced. In other words, if an operator loads a tree at loading station 23, the mechanism described rotates the tree and bales such tree while moving such tree toward loading platform or station 24. When the tree is completely baled, the carriage arrives at station 24, the tree clamping means automatically operate to position themselves to receive a tree trunk of a tree loaded at station 24, and the tree from station 24 is thereafter rotated and moved while being baled toward station 23. As has been mentioned heretofore, one tree can be handled by the apparatus described per minute.

Referring to Figure 7, it will be seen that loading station 23 comprises a number of upright members 150 secured together by horizontally extending channel members 152, 153 and 154. Crosswise extending channel members 156 and 157 are provided at an angle to the horizontal and secured to members 153 by means of vertical channel members 158. A suitable smooth surface may be provided to form a chute, by spanning members 156 and 157 by means of a sheet 160 of any suitable material. A semi-enclosed chute is provided which enables the operator to see fully the passage of the tree therethrough, trunk first. As has been mentioned, ring 16 serves to restrict the exterior dimension of the tree. Mounted on channel member 154, Figure 7, is a supply 170 of cord, twine or like wrapping means. An aperture 171 is provided at the base of supply container 170 through which cord 28 extends from cord roll 180. A novel mechanism is provided for insuring suitable cord tension. The string tightener comprises a member 190 having an arcuate portion terminating in a flat portion 192 secured by means of a bolt 193 to the bottom of the container 170. At the other end of member 190 there is provided a further flattened portion having secured thereto a washer 194 through which the string 28 passes. String tightener further comprises a second member 200 having a flat portion 201 secured to the bottom of container 170 by bolt 193, a curved portion 202 having an opening therein for reception of the cord 28, and a second flat portion 204 terminating in a hinge 205. Extending through an opening in flat portion 204 is a bolt 207 which also extends through a member 209 having an opening therethrough for passage therethrough of the bolt 207. Member 209 has a portion 220 extending closely adjacent and along the portion of member 190, with the twine therebetween. Member 209 is connected to the hinge 205. A spring 222 is arranged around bolt 207, and the spring acts between two members 224 and 225 the latter arrangement being held in place by a nut 228. It will be observed that by adjusting nut 228 any suitable or desired tension can be achieved and that once an adjustment is made, cord fed from the supply 170 will be fed under uniform tension. Each tree will therefore be baled in a uniform manner.

Figure 1:
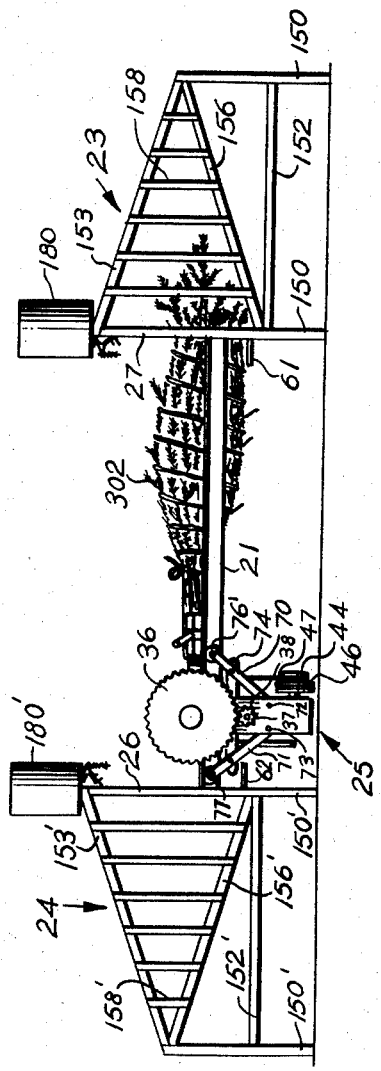
Figure 1 is a side elevational view of the machine according to the invention showing a Christmas tree operatively disposed therein.
Figure 2:
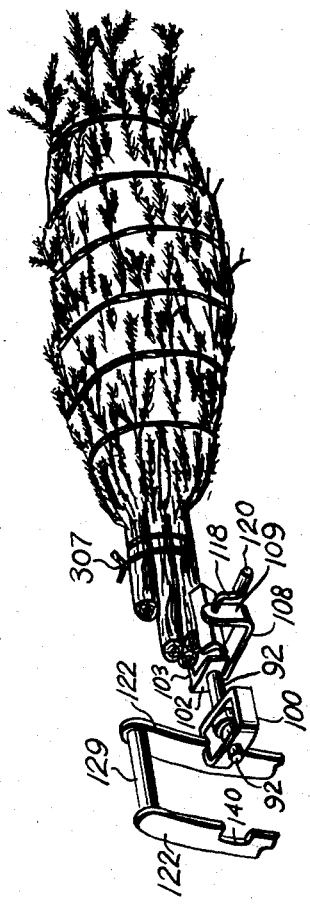
Figure 2 is a fragmentary perspective view of the mechanism responsible for imparting rotational movement to the Christmas trees to be baled during their passage through the apparatus.

It will be seen from the foregoing description that beginning with the tree 300 as shown in Figure 3, it is possible to produce a very neatly baled tree 302, Figure 4, or Figure 1. If desired, and if the trunks of several trees are first fastened together, the group of trees, as shown in Figure 2, and identified by the reference numeral 306 may be baled together, utilizing the present apparatus.

At the start of the operation, the cord 28 is drawn down manually and tied to the trunk, as at 307 (Figure 4). At the conclusion of the operation, the cord 28 is broken and tied, as at 308, this operation being performed manually.

While various changes may be made in the detail construction, it shall be understood that such changes shall be within the spirit and scope of the present invention as defined by the appended claims.

What I claim as new and desire to protect by Letters Patent of the United States is:

1. A Christmas tree baler comprising, in combination, a loading station comprising a stationary frame, auxiliary frame means rotatably supporting a Christmas tree to be baled upon said stationary frame, a pair of longitudinally extending racks, a U-shaped carriage movable along said racks and depending therefrom, means on said carriage for clamping the trunk of a Christmas tree, means rotating said clamping means while said carriage moves along said rack, and a supply of cord operatively disposed relative to said carriage whereby to bale said tree while it is rotating and moving along said racks, said carriage comprising a U-shaped frame member, a main shaft rotatable in reversible directions and journalled in the upper ends of said U-shaped frame member, pinions on said shaft cooperating with said racks, said shaft and said pinions forming a part of the means rotating said clamping means while moving said carriage along said racks, said means rotating said clamping means while moving said carriage along said racks further including a motor supported by said bottom of said U-shaped frame member, pulley and belt means, a reversing gear box connected to said motor by said pulley and belt means, a second shaft extending from said reversing gear box, a pinion on said second shaft, a large gear on said second shaft, and gear means connecting the trunk clamping means to the main shaft, a housing cooperating with the gear means connecting the main shaft to the trunk clamping means, said housing including roller bearings, means supported on said U-shaped frame member for limiting the movement of said housing in either direction of rotation of said main shaft, said auxiliary frame means comprising a circular frame having a central opening slidably supporting the Christmas tree for movement therethrough with the base end thereof leading, and bearing means rotatably supporting said auxiliary frame upon said main frame, said gear means connecting the main shaft of said trunk clamping means comprising a gear on the main shaft and a gear on a part of said housing, said gears having axes at right angles to one another, the gear on the part of said housing having connected thereto the trunk clamping means, said bearing means comprising a plurality of pulleys rotatably engaging the periphery of said annular frame, said trunk clamping means comprising a third shaft connected to the gear mounted on part of said housing, an angle member extending parallel to the axis of said third shaft, blade means cooperating with said angle member for grasping the trunk of the tree, a second angle member movable toward and away from said first angle member, said second angle member being provided with pointed members for grasping the trunk of a tree, whereby said angle member is movable toward said first angle member to firmly grasp the tree trunk therebetween, the periphery of said circular frame being bevelled on both sides to define a knife edge for engagement with said pulleys, manually operable means for selectively moving said second angle member relative to said first angle member, and pressure means carried by said annular auxiliary frame for urging the branches of a tree passing therethrough into compressed engagement with each other.

2. The combination according to claim 1, further comprising a loading station at each end of said longitudinally extending racks, and shut-off means associated with said gear box having stop arms in engagement with a control lever carried by said gear box, one of said stop arms being located at each one of said loading stations.

3. The combination according to claim 2, wherein said pressure means comprises a plurality of circumferentially spaced apart arms hingedly supported upon said annular frame for pivotal movement from a normal coplanar position with said annular frame toward an outwardly extending position in the direction of movement of said tree, and yieldable means resiliently urging said arms toward said coplanar position in response to the passage of a tree through said main frame with the base of the tree leading.

4. The combination according to claim 3, further including means for controlling said gear box when said U-shaped frame member is at the end of its travel and under the control of one of said shut-off means.

5. The combination according to claim 4, further comprising a transversely extending rod secured at a mid section to each one of said arms, all of said rods defining a rectangular opening of adjustable size for receiving the base of the tree to be baled, said arms and rods urging the branches of said tree together during movement of said tree therethrough.

References Cited in the file of this patent
UNITED STATES PATENTS

| | | |
|---|---|---|
| 988,347 | Johnson | Apr. 4, 1911 |
| 2,792,775 | Beyette | May 21, 1957 |